United States Patent [19]

Dalupin

[11] Patent Number: 5,127,385
[45] Date of Patent: Jul. 7, 1992

[54] MAGNETIC APPARATUS FOR TREATING FUEL

[75] Inventor: Romulo V. Dalupin, Blue Grass, Iowa

[73] Assignee: Gekko International, Inc., Blue Grass, Iowa

[21] Appl. No.: 574,187

[22] Filed: Aug. 28, 1990

[51] Int. Cl.⁵ ............................................. F02M 33/00
[52] U.S. Cl. ...................................... 123/538; 123/537
[58] Field of Search ........................ 123/536, 537, 538

[56] References Cited

U.S. PATENT DOCUMENTS

| | | |
|---|---|---|
| 4,050,426 | 9/1977 | Sanderson . |
| 4,188,296 | 2/1980 | Fujita . |
| 4,357,237 | 11/1982 | Sanderson . |
| 4,414,951 | 11/1983 | Saneto ............................ 123/536 |
| 4,711,271 | 12/1987 | Weisenbarger et al. ........... 123/538 |

FOREIGN PATENT DOCUMENTS

| | | | |
|---|---|---|---|
| 1092917 | 1/1981 | Canada . | |
| 0129161 | 6/1988 | Japan | 123/536 |
| 0077743 | 3/1989 | Japan | 123/536 |
| 0019642 | 1/1990 | Japan | 123/536 |

*Primary Examiner*—Andrew M. Dolinar
*Assistant Examiner*—M. Macy
*Attorney, Agent, or Firm*—Henderson & Sturm

[57] ABSTRACT

The apparatus includes magnetic means diametrically opposed at opposite sides of a fuel line conveying hydrocarbon fuel such as gasoline, diesel fuel or the like to the fuel/air mixture means of an internal-combustion engine. The treatment means includes a splitter section for subjecting the fuel to magnetic influence in a first stage or section and subsequently to an expander section including several magnets and collectors through which the fuel line extends coaxially, there being a final direct magnetic exposure contact of the fuel in the expander section.

15 Claims, 4 Drawing Sheets

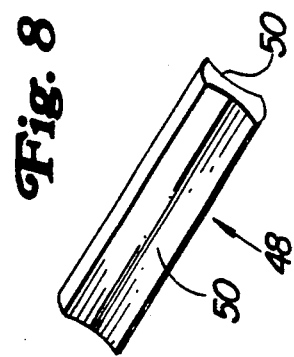
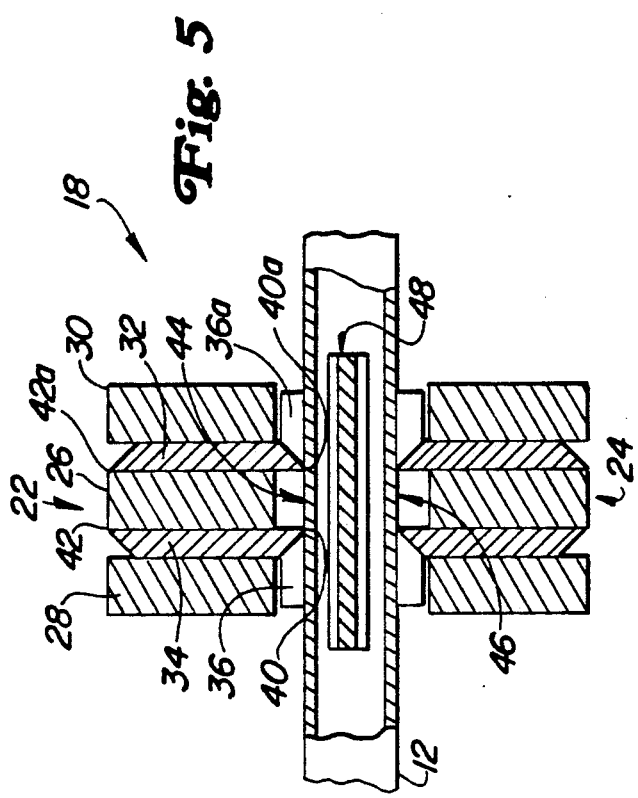
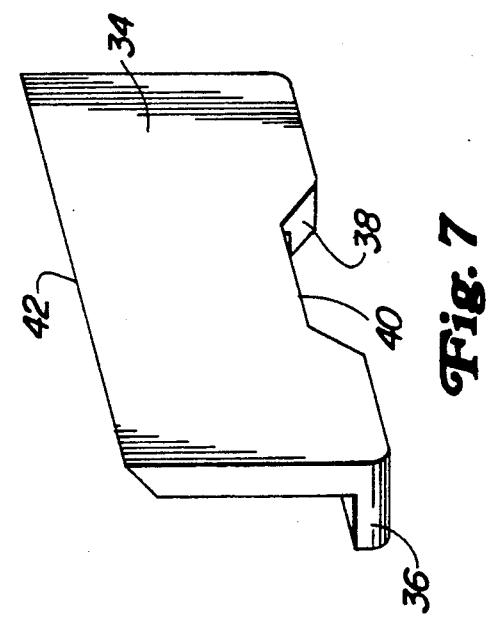
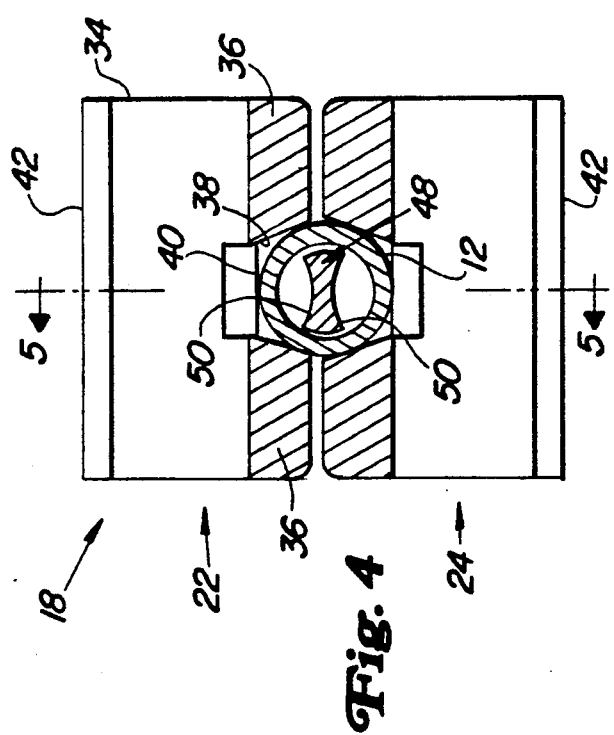
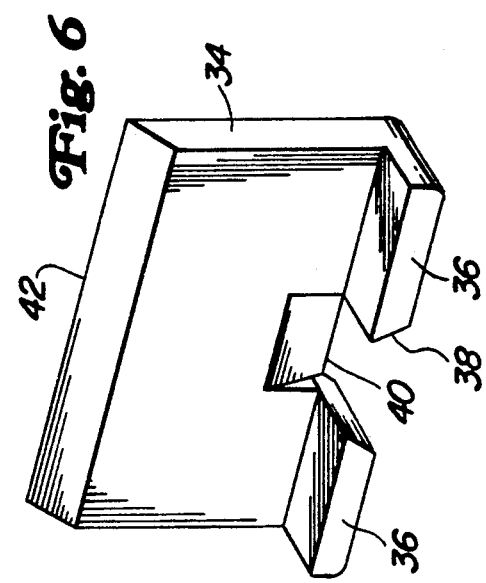

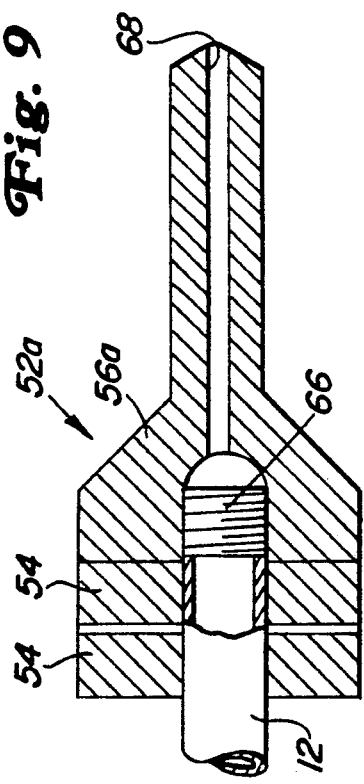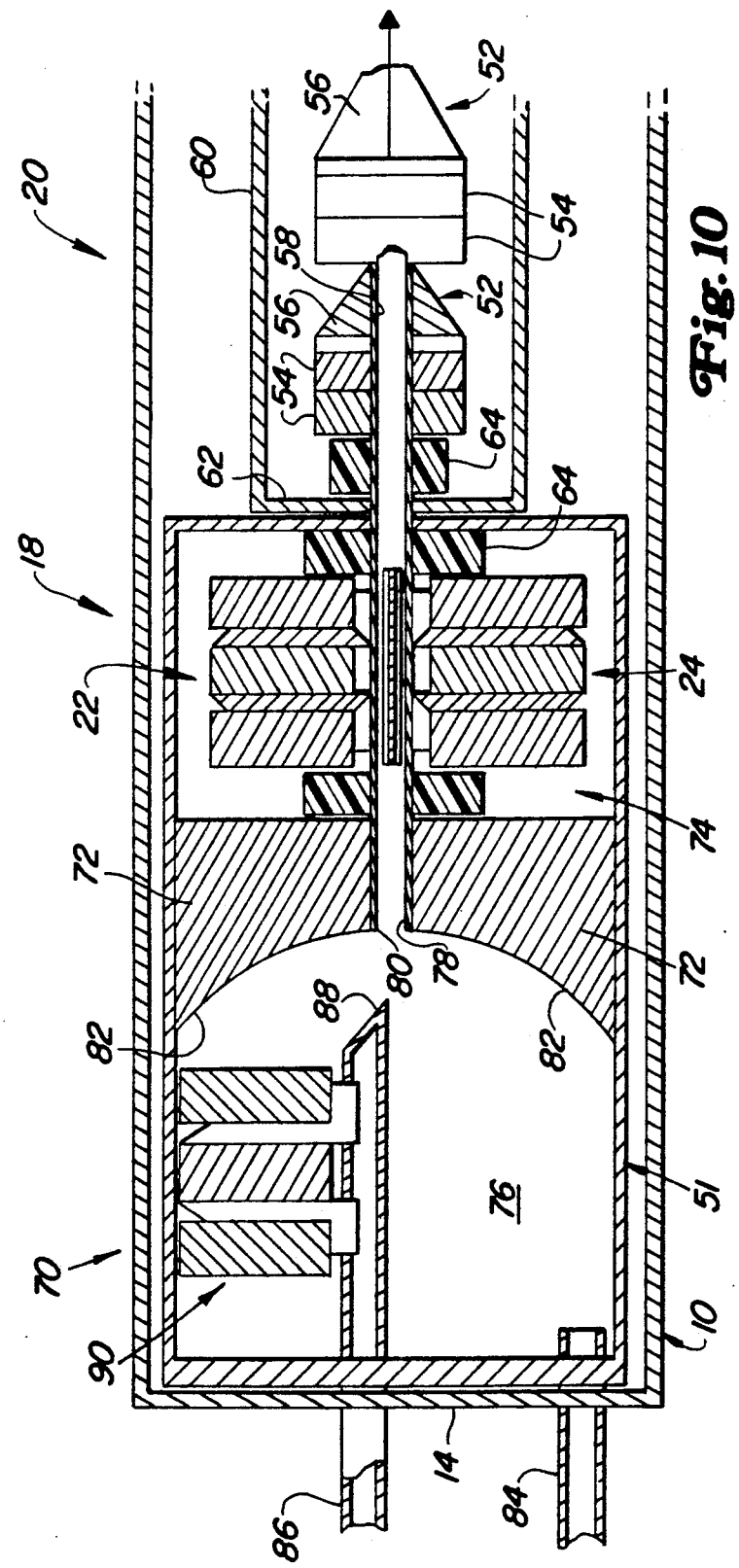

MAGNETIC APPARATUS FOR TREATING FUEL

BACKGROUND AND SUMMARY OF THE INVENTION

The magnetic treatment of fuel has been known in the prior art as a means for improving the combustion of the fuel with the derived benefits of cleaner engines and reduction of noxious emission from the engine exhaust. A good example of prior art along these lines is the Canadian Patent No. 1,092,917 of Jan. 6, 1981, to Dalupan, the applicant in the present application. As noted in that patent, by way of example, molecular expansion of fuel prior to its introduction into an internal-combustion results in a much more efficient combustion. This expansion is in terms of the actual swelling of the hydrocarbon molecules comprising the fuel. This is more significant in a diesel engine as compared to a gasoline-burning engine because of the extensive prior refinement of gasoline. Nevertheless, the invention is applicable to both types of fuels as well as to their equivalents.

It is therefore one of the main objects of the present invention to provide improved magnetic means for treating fuel within a fuel line by subjecting the fuel to successive regions of negative and positive magnetic influence for improving the combustion of the fuel, leading to the benefits of energy and cost savings, more power and fewer noxious emissions.

It is a further feature of the invention to so treat the fuel as to split off the paramagnetic particles from the hydrocarbon molecules and to then expand the latter. In the achievement of this object or feature, magnetic means is arranged at opposite sides of a fuel line so that at one side of the line the north or positive pole is upstream of the line and the south or negative pole is downstream, while at the diametrically opposite side of the line the poles are reversed. By way of improving the magnetic influence, a reflector is fixed within the line in alignment with the magnetic units at opposite sides of the line. It is a feature of the invention that the reflector is press fitted into the line as an inexpensive and positive means of securing it in place. The results achieved are enhanced where the fuel flow rate is such as to cause turbulent fuel flow in the line.

Further features and objects reside in the second or expander stage downstream of the primary or splitter stage, wherein the expander stage is made up of a plurality of magnet-collector units, each comprising a magnet of annular or ring-like nature con-centrically fitting the line and an accompanying coaxial collector of truncated conical shape oriented with its base in face-to-face contact with the downstream face of the magnet ring and with its smaller diameter pointing downstream and in face-to-face contact with the upstream face of the next downstream magnet ring. It is a feature that the expander includes ten such units in the interests of providing maximum efficiency within acceptable size limitations.

Additional features and objects will appear as the disclosure progresses in conjunction with the accompanying drawings.

DESCRIPTION OF THE DRAWINGS

FIG. 4 is a partial section on the line 4—4 of FIG. 2.

FIG. 5 is a section on the line 5—5 of FIG. 4.

FIG. 6 is a perspective of one of the components of the magnetic pack in the splitter section of the apparatus.

FIG. 7 is a perspective of the component as seen from the opposite side.

FIG. 8 is a perspective view of the reflector component of the splitter section of the apparatus.

FIG. 9 is an enlarged section of the last downstream magnet/collector unit in the expander section of the apparatus.

FIG. 10 is an enlarged, fragmentary view, partly in section, showing an alternate embodiment of the invention.

DETAILED DESCRIPTION OF A PREFERRED EMBODIMENT OF THE INVENTION

Figure 1:
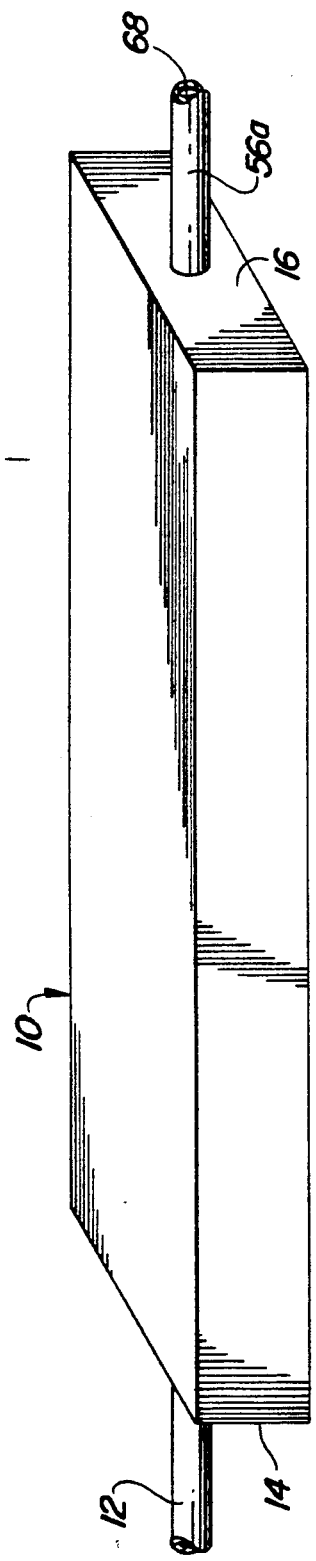
FIG. 1 is a perspective of a selected type of overall casing-contained apparatus.

FIG. 1 shows that the apparatus may be contained within a suitable casing 10 of parallelepiped configuration and composed of material, for example aluminum, not inconsistent with the magnetic influences exerted within the casing on a tubular fuel line 12, preferably of copper, which extends lengthwise from end to end of the casing and which projects from the casing at its inlet end. For the purposes of orientation only, the left end of the fuel line in FIG. 1 is its inlet or upstream end. Hence, fuel flow is from left to right in FIGS. 1, 2, 3, 5 and 8. Although the line 12 is shown as straight as typical of conventional practice, it could have other configurations. Hence, such expressions herein as "top," "bottom," etc. are terms of convenience and not limitation.

Figure 2:
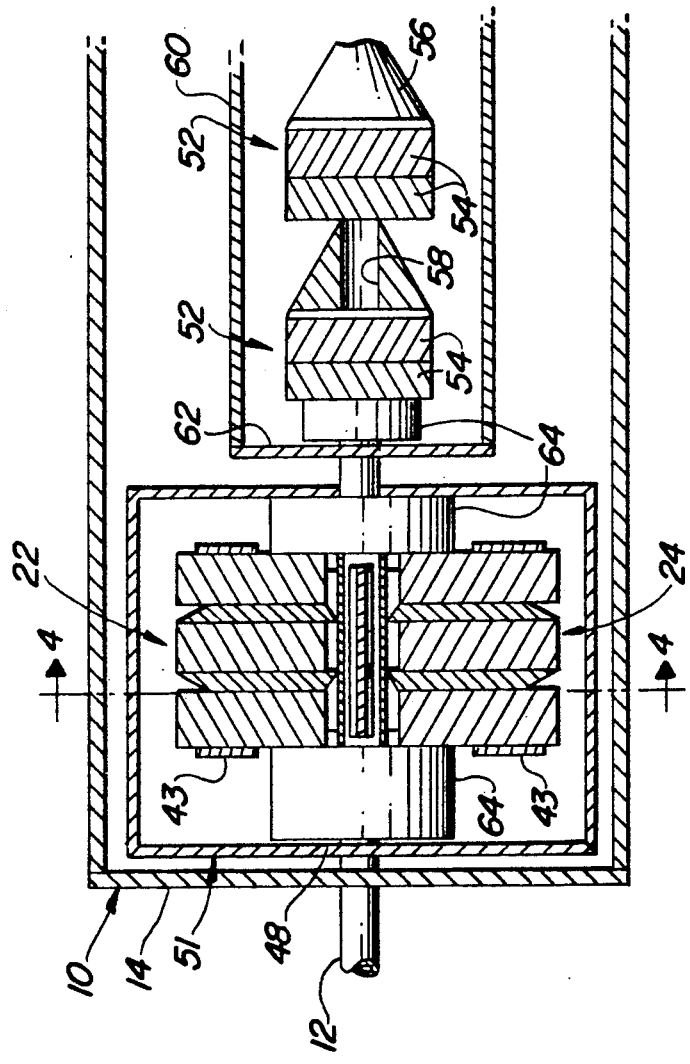
FIG. 2 is an enlarged fragmentary view, partly in section, showing part of the interior means.
Figure 3:
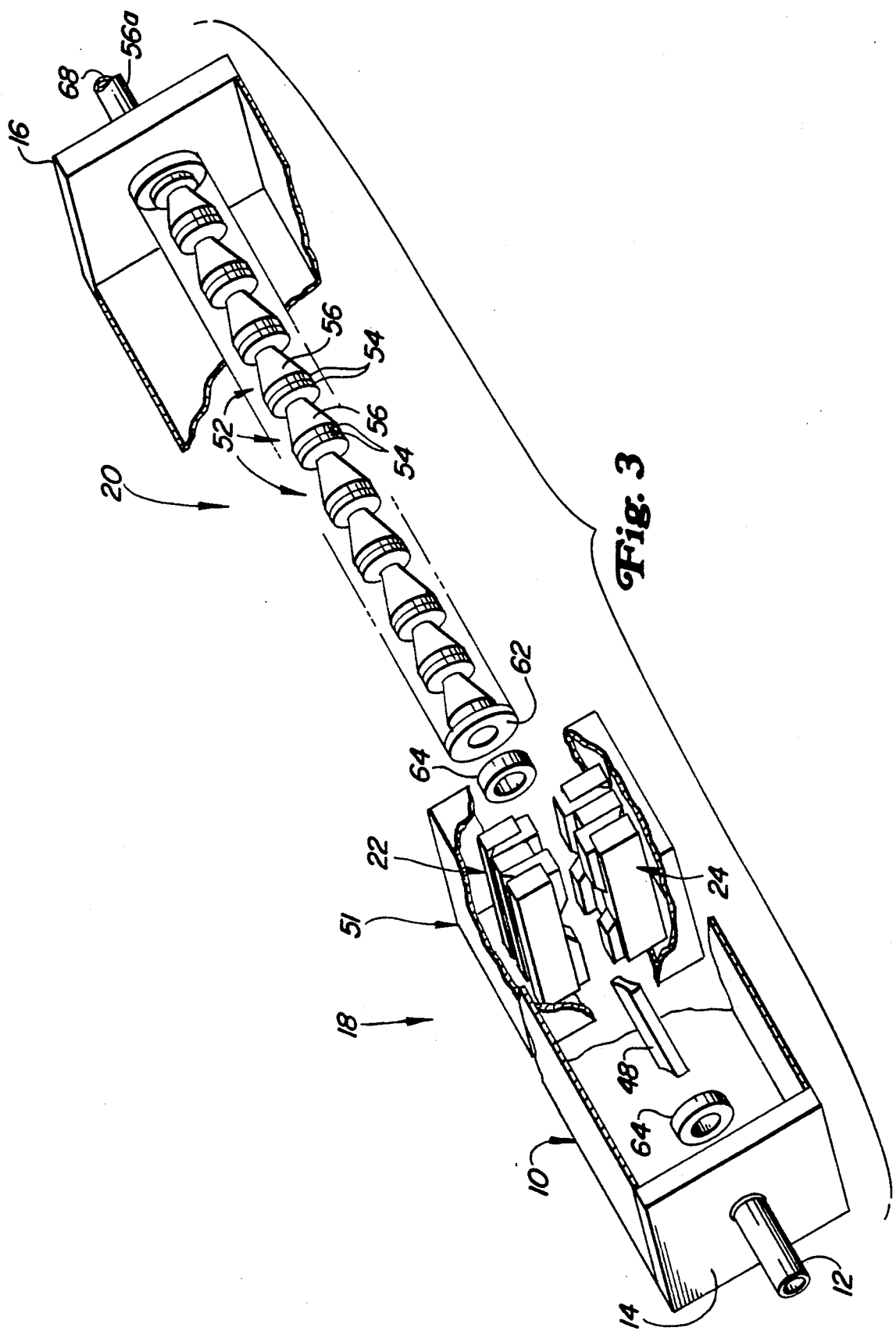
FIG. 3 is an exploded, fragmentary perspective view of the components of both sections of the apparatus.

In FIG. 3, the upstream end of the casing is depicted at 14 and the downstream end at 16. The basic apparatus is contained within the casing and comprises a splitter section or stage 18 and an expander stage or section 20. As best seen in FIGS. 2 and 3, the fuel line 12 extends lengthwise through the casing 10, partly embraced by the splitter section 18 and passing coaxially through the components (to be described in detail later) of the expander section 20. The vehicle fuel line, not shown, is coupled to inlet end of line 12 and the outlet of the expander section 20 by structures well known in the art.

Reference will now be had to FIGS. 2-8 for details of the splitter section 18. The magnetic means of this section comprises a pair of magnetic laminar packs 22 and 24 arranged so as to be diametrically opposed at opposite sides of the fuel line, in the illustrated instance above and below the line. The upper pack or unit 22 comprises a plurality of plate-like magnetic elements including a central element or member 26 and a pair of outer members 28 and 30. A pair of intermediate members 32 and 34 are sandwiched between the other members and adhered thereto by any suitable magnetic adhesive. The material of the members 26, 28 and 30 is preferably of the ceramic type; whereas the members 32 and 34 are comprised of a ferromagnetic material, preferably steel. Each of the intermediate members is of L-shaped section (FIG. 6) having a pair of lugs or ledges 36 spaced apart to provide a central notch 38 in an intermediate portion between the lugs, and the notch has a transverse sharp edge 40 that engages the fuel line from above. The other intermediate member 32 is arranged as a duplicate but mirror image of the member 34 and has a sharp edge 40a as well as ledges 36a. The inner or fuel-line-proximate portions of the members 28 and 30 rest respectively on the ledges 36 and 36a. Each of the members 32 and 34 is further provided with sharp outer edges 42 and 42a respectively. A nonmagnetic tape, or a clip 43 comprised of aluminum or the like, passes around and secures together the elements of unit 22. The lower pack or unit 24 is identical to that described and need not be described in detail. Suffice it to note that the plate-like members are respectively aligned or coplanar in planes radial to the axis of the fuel line.

The polarity arrangement of the members in the upper pack or unit 22 is as follows: The left-hand or upstream side and edges of the member 28 are south, and its opposite side and edges are north. This is true also of the sides and edges of the other outer member 30. The upstream and downstream sides and edges of the central member are north and south respectively. The flux occurs across the edges 40 and 40a in the area indicated by the numeral 44 and also across the edges 42–42a. The situation respecting polarity is reversed for the members of the lower pack 24, and flux occurs in the area indicated at 46 and also at the outward sharp edges corresponding to the edges 42 and 42a, as will be clear without detailed repetition.

As best seen in FIGS. 4, 5 and 8, the fuel line 12 carries internally thereof a reflector 48 having a width such as to span the fuel line on a diameter thereof that is normal to the diameter on which the packs 22 and 24 lie. The width of the reflector is preferably such that it has a press or force fit with the inside diameter of the fuel line so that its position in the line is fixed. The length or longitudinal dimension of the reflector is on the order of the axial dimension of the packs 22 and 24. The purpose of the reflector is to "scoop" the flux in the areas 44 and 46, for which purpose the reflector has diametrically opposed concave faces 50. The reflector is constructed from a ferromagnetic material, preferably steel. A casing 51, of aluminum or equivalent material, encloses the splitter section 18.

The expander section or stage of the apparatus is best shown in FIGS. 2 and 3 as being made up of a series of end-to-end magnet-collector units 52, each comprising a pair of face-to-face magnets 54 in the form of circular rings or washers having central through openings that tightly fit the fuel line 12 so that the rings are concentric with the line. Each collector 56 takes the form of a truncated cone having an axial through opening or bore 58 tightly fitting the fuel line 12. Each collector has its base in face-to-face contact with the downstream face of the next upstream ring 54 so that the smaller diameter end of the collector is in face-to-face contact with the upstream face of the next downstream ring 54. This pattern is repeated throughout the length of the expander. The rings are preferably of ceramic magnetic material, the collectors are preferably of ferromagnetic steel, and the units are preferably ten in number, which arrangement gives the greatest performance consistent with keeping the size of the apparatus within reasonable bounds.

Fewer units could be used with a sacrifice in performance. More units, preferably in multiples of ten, could produce greater efficiency but the length of the expander would become unduly long in most situations.

The units are enclosed in a concentric tubular sleeve or casing 60, of aluminum or equivalent material, that extends axially from the inner or upstream face of the outer casing end wall 16 to a circular upstream end wall 62 (FIG. 2) which is affixed to the sleeve so that the units 52 are enclosed within the sleeve. Suitable grommets 64 of non-magnetic material are used where necessary for spacing, etc. The space between the sleeve and the units 52 is filled with a suitable hardenable resin or equivalent material. The axial integrity of the assembly is further maintained by screw-threading the downstream end of the fuel line 12 into the final or last downstream unit 52a, as indicated at 66 (FIG. 9). The fuel line has a press fit with the rings 54 of this last unit, and the cone or collector 56a, threaded on to the fuel line assures a tight fit. Since the downstream end of the fuel line does not extend entirely through the last collector, the collector has an interior axial passage 68 of reduced diameter in a downstream direction. This passage is in direct contact with fuel.

All collectors have south polarity. As for the rings 54, each has its north upstream and its south downstream.

An alternate form of the magnetic apparatus for treating fuel is shown at 70 in FIG. 10. The outer casing 10 and interior casing 51 are longitudinally elongated, and the casing 51 preferably is formed from a nonferromagnetic material which resists oxidation, such as certain varieties of stainless steel. An intermediate partitioning wall 72, formed from a material which is not ferromagnetic, is fixed as by welding inside the casing 51. A first chamber 74 is formed as before for enclosing the components of the splitter section 18. A second, auxiliary chamber 76 is formed upstream from the first chamber 74. A central axial bore 78 is formed through wall 72 and receives one end of a tubing 80 of copper or the like which passes axially through the splitter 18 and expander 20 sections as previously described. The upstream side of the wall 72 has a generally concave surface 82. Attached to the main fuel line of the vehicle is a line 84, preferably of stainless steel, which extends through casings 10, 51 to discharge fuel from the fuel tank (not shown) into the chamber 76. Attached to the fuel return line of the vehicle is a line 86, also of stainless steel, which likewise extends through casings 10, 51 into the chamber 76. The free discharge end 88 of line 86 is cut at a bevel such that the relatively shorter wall part thereof is disposed closer to the inside surface of casing 51 than the relatively longer wall part thereof.

An auxiliary splitter section 90 is press fit between the fuel return line and the inside surface of casing 51. The components of section 90 and the polarities thereof are identical to the upper pack 22 described previously.

Not all fuel reaching the engine fuel pump passes through the fuel injectors. Normally an excess of fuel is supplied to the engine fuel pump to prevent "air locking" of the injectors. This fuel does become heated during this process. Normally this fuel travels by a fuel return line back to the main fuel tank. Such tanks are normally vented to prevent water condensation inside the tank. There is some hydrocarbon leakage to the air through such venting. Discharge of the relatively hotter return fuel into the tank elevate temperatures therein such that hydrocarbon leakage is increased.

The magnetic apparatus 70 reduces hydrocarbon leakage to the air by returning fuel to the chamber 76. The return fuel is treated by the auxiliary splitter 90 to split off ferromagnetic particles which may have been collected from the fuel line and to reinforce previous expansion of the hydrocarbon molecules. Due to the beveled end 88 and the concave surface 82, the return fuel is directed about the chamber 76 such that it mixes with the relatively cooler fuel entering at 84 from the fuel tank. The temperature of all fuel in the chamber is maintained in a preferred temperature range of 100 to 140 degrees fahrenheit; whereby the fuel is more effectively treated when it passes through the splitter and expander sections 18, 20, which in turn results in more efficient combustion.

The industrial applicability of this magnetic apparatus for treating fuel is believed to be apparent from the foregoing description and the benefits of enhanced fuel efficiency and reduction of environmental pollutants. Although the preferred embodiment and a modification thereof have been disclosed herein, it is to be remembered that various alternate constructions can be made thereto without departing from the scope of the invention.

I claim:

1. Apparatus for improving the combustion characteristics of fuel in an internal combustion engine or the like, comprising, in combination with a tubular fuel line of non-magnetic material, magnetic means made up of a pair of magnetic units arranged on diametrically opposite sides of and engaging the fuel line for subjecting the fuel in the line to magnetic influence, and a reflector fixed within the fuel line in alignment with the magnetic units.

2. Apparatus according the claim 1, in which the reflector extends lengthwise of the fuel line and also crosswise of the fuel line on a diameter normal to the diameter on which the magnetic units are opposed.

3. Apparatus according to claim 2, in which the reflector has diametrically opposed concave faces directed respectively toward the magnetic units.

4. Apparatus according to claim 2, in which the reflector is so dimensioned with respect to the inside diameter of the fuel line as to have a press fit within the fuel lines.

5. Apparatus according to claim 1, in which each magnetic element is in the form of a laminar pack comprising a plurality of plate-like members arranged respectively in parallel planes radial to the fuel line axis.

6. Apparatus according to claim 5, in which at least one member in each pack has an inner sharp edge portion in contact with the proximate side of the fuel line.

7. Apparatus according to claim 5, in which at least one member in each pack has a notched fuel-line-proximate portion fitting over and contacting the proximate side of the fuel line.

8. Apparatus according to claim 7, in which the part of the notched portion contacting the fuel line is sharp.

9. Apparatus for improving the combustion characteristics of fuel in an internal combustion engine or the like, comprising, in combination with a tubular fuel line of non-magnetic material, a splitter section including magnetic means made up of a pair of magnetic units arranged diametrically opposite sides of and engaging the fuel line for subjecting the fuel in the line to magnetic influence, and an expander section embracing the fuel line downstream of the splitter section and including a plurality of additional magnetic elements, each magnetic element including at least one circular ring-like magnet concentrically fitting the fuel line and a truncated conical collector having an axial through opening concentrically fitting the fuel line and having its base end in contact with the upstream ring-like magnet and with its smaller diameter pointing downstream and in contact with the next downstream ring-like magnet.

10. Apparatus according to claim 9, in which the last downstream element is fitted to and in series with the downstream end of the fuel line and has an axial passage in communication with the fuel line.

11. Apparatus according to claim 9, in which there are ten substantially identical magnetic elements.

12. Apparatus according to claim 9, the engine being fueled by a line from a tank and having a return fuel line in which an auxiliary chamber is formed upstream from said tubular fuel line and splitter section, the tank fuel line and the return fuel line both communicating with said chamber, means for facilitating mixing of fuel disposed within said chamber, and auxiliary splitter means fitted inside said chamber.

13. Apparatus according to claim 12, in which said auxiliary chamber includes an interior wall surface and said means for facilitating mixing of fuel includes concave surface means formed on said interior wall surface.

14. Apparatus according to claim 13, in which a first fuel line connects said auxiliary chamber and the vehicle return fuel line, said auxiliary splitter means fitting between said first fuel line and said interior wall surface.

15. Apparatus according to claim 14, in which said means for facilitating mixing of fuel includes beveled end means formed on said first fuel line.

* * * * *

UNITED STATES PATENT AND TRADEMARK OFFICE
CERTIFICATE OF CORRECTION

PATENT NO. : 5,127,385

DATED : July 7, 1992

INVENTOR(S) : Romulo V. Dalupan

It is certified that error appears in the above-identified patent and that said Letters Patent is hereby corrected as shown below:

Cover page, item [75]      Delete "Dalupin" and insert instead -- Dalupan --.

Signed and Sealed this

Ninth Day of November, 1993

Attest:

BRUCE LEHMAN

*Attesting Officer*      *Commissioner of Patents and Trademarks*